United States Patent [19]

Kwak et al.

[11] Patent Number: 5,862,127
[45] Date of Patent: Jan. 19, 1999

[54] METHOD OF CONTROLLING THE PEAK CELL RATE SPACING OF MULTIPLEXED ATM TRAFFIC

[75] Inventors: Dong Yong Kwak; Hong Shik Park, both of Daejeon, Rep. of Korea

[73] Assignees: Electronics and Telecommunications Research Institute, Daejeon; Korea Telecommunications Authority, Seoul, both of Rep. of Korea

[21] Appl. No.: 767,028

[22] Filed: Dec. 12, 1996

Related U.S. Application Data

[63] Continuation-in-part of Ser. No. 372,029, Jan. 12, 1995, abandoned.

[30] Foreign Application Priority Data

Mar. 18, 1994 [KR]  Rep. of Korea ................. 1994-5509

[51] Int. Cl.$^6$ ................................................. H04L 12/56
[52] U.S. Cl. ...................... 370/233; 370/253; 370/396; 370/412
[58] Field of Search ................................... 370/229, 230, 370/231, 232, 233, 235, 237, 252, 253, 389, 392, 395, 396, 397, 412; 395/200.63, 200.64, 200.65, 200.66

[56] References Cited

U.S. PATENT DOCUMENTS

| | | | |
|---|---|---|---|
| 5,179,556 | 1/1993 | Turner | 370/233 |
| 5,241,536 | 8/1993 | Grimble et al. | 370/398 |
| 5,278,825 | 1/1994 | Wallmeier et al. | 370/232 |
| 5,285,442 | 2/1994 | Iwamura et al. | 370/234 |
| 5,297,140 | 3/1994 | Boyer et al. | 370/229 |
| 5,392,280 | 2/1995 | Zheng | 370/353 |
| 5,629,937 | 5/1997 | Hater et al. | 370/233 |
| 5,745,490 | 4/1998 | Ghufran et al. | 370/397 |
| 5,748,614 | 5/1998 | Wallmeier | 370/235 |

OTHER PUBLICATIONS

Eugen Wallmeier et al., International Swictching Symposium, XIV, vol. 2, Oct. 1992, "The Spacing Policer, An Algorithm for Efficient Peak Bit Rate Control in ATM Networks".

Pierre E. Boyer et al., IEEE Network, Sep. 1992, "Spacing Cells Protects and Enhances Utilization of ATM Network Links".

Pierre E. Boyer et al., International Switching Symposium, XIV, vol. 2, Oct. 1992, "The Spacer–Controller: An Efficient UPC/NPC for ATM Networks".

Primary Examiner—Alpus H. Hsu
Attorney, Agent, or Firm—Venable; Robert J. Frank; Allen Wood

[57] ABSTRACT

The present invention relates to a method for controlling the peak cell rate spacing of multiplexed ATM traffic. The method includes the steps of: (a) examining whether a cell has arrived for each time slot; (b) if arrived, saving the cell in a node specified by a free list header, linking the node to an event scheduler or a temporary queue according to the number of cells that have arrived and departed, linking nodes which are linked to a present cell time slot location of the event scheduler to an output list, transferring the cell in the first node linked to output list header to the output list, and linking the node which was used by the just-departed cell to free list, and if the number cells that have arrived and departed including the just-departed cell are different, linking the first node of the temporary queue to an appropriate location of the event scheduler; and (c) if not arrived, linking nodes which are linked to a present cell time slot location of the event scheduler to the output list, transferring the cell in the first node linked to output list header to the output list, and linking the node which was used by the just-departed cell to the free list, and if the number of cells that have arrived and departed including the just-departed cell are different, linking the first node of the temporary queue to an appropriate location of the event scheduler.

1 Claim, 7 Drawing Sheets

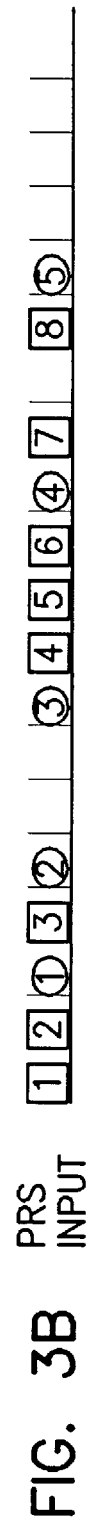
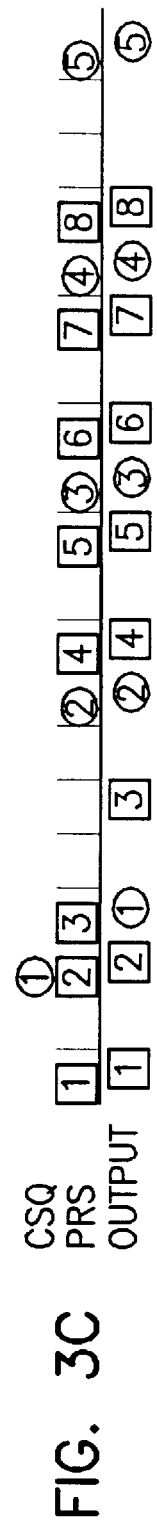
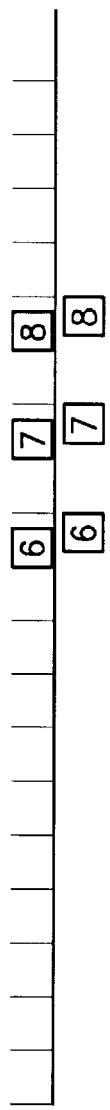
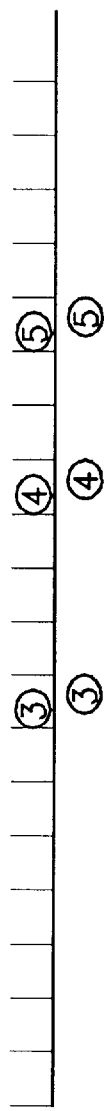

METHOD OF CONTROLLING THE PEAK CELL RATE SPACING OF MULTIPLEXED ATM TRAFFIC

CROSS REFERENCE TO RELATED APPLICATIONS

This application claims the priority of Application Serial Number 1994-5509, filed Mar. 18, 1994 in Korea, the subject matter of which is incorporated herein by reference. Furthermore, this application is a continuation-in-part of U.S. application Ser. No. 08/372,029, filed Jan. 12, 1995, now abandonded, which is also incorporated herein by reference.

BACKGROUND OF THE INVENTION

1. Field of the Invention

The present invention relates to a method for controlling the peak cell rate spacing of multiplexed ATM traffic, and more particularly to a method for controlling the peak cell rate for multiple virtual channel connections which can secure a peak cell rate negotiated between a user and a network.

2. Description of the Prior Art

In asynchronous transfer mode (ATM) networks, network resources are allocated through a negotiation between a user and a network during the connection establishment phase. To prevent the ATM network from reaching an unacceptable congestion level due to an intentional excess of the negotiated parameters, it is necessary to monitor whether or not the traffic flow on every virtual channel connection (VCC) conforms to the negotiated traffic parameters. This is called a policing or a usage parameter control (UPC) function. At present only the peak cell rate, among traffic parameters, is defined in Recommendation I.371 by the International Telecommunication Union-Telecommunication Standardization Sector (ITU-T).

However, the peak cell rate monitored during the usage parameter control is usually different from the peak cell rate generated at the source (negotiated between the user and the network). This is due to the cell delay variation, which changes the cell flow generated in the source of the ATM connection. The cell delay variation is principally caused by the competing demands of cells to share the same resources, the same queue, or the same trunk. Therefore, with the monitoring function which monitors the peak cell rate not considering the cell delay variation, a mistaken judgment of violating traffic could occur even when a user complies with the negotiated peak rate.

Accordingly, cell delay variation tolerance should be included in the monitoring function, but this would make it more difficult to monitor users who intentionally send traffic beyond the negotiated amount. In addition, the efficiency of the bandwidth could drop considerably if a wide cell delay variation tolerance were set up.

Previous technologies to solve these problems are the space controller and the spacing policer. The spacing policer calculates a time D when a cell of a connection, which arrived at the spacing policer at a time T, is to leave, and links the cell to a (T+D) location. Here, D indicates the number of cell time slots for securing a minimum transfer interval between cells of the connection. However, if multiple cells are linked to the (T+D) location, only one cell is output at the (T+D) location and the rest are delayed. This phenomenon is called "output contention." If the next arriving cells are output without delay, the peak interval of the connection could become smaller than desired. According to the result of a simulation, it has been shown that approximately 20% of the cells can be transferred faster than the desired peak interval. The spacer controller compares the theoretical cell arriving time and the present arriving time "t" using variables indicating a theoretical cell arriving time (TAT). If "t" is smaller than TAT, it saves the cells at the TAT location in a retransfer memory so as to let the cells arriving at the present time leave at the TAT time, and secures a desired peak interval between cells. However, even with this method, an interval smaller than the negotiated peak interval may occur due to output contention.

Therefore, the conclusion can be made that transfers with the interval smaller than the negotiated peak interval complicate the bandwidth assignment strategy and drop the band efficiency.

SUMMARY OF THE INVENTION

Therefore, the present invention has been made to solve the above problems, and it is an object of the present invention to provide a method for controlling the peak cell rate spacing of multiplexed ATM traffic, which method is capable of securing the negotiated peak interval even during output contention by using a counter which memorizes the numbers of arrived cells and departed cells of each connection and temporary queue.

In accordance with the present invention, the above and other objects can be accomplished by providing a method for controlling the peak cell rate spacing comprising the steps of: (a) examining whether a cell has arrived for each time slot; (b) if a cell has arrived in step (a), saving the cell in a node specified by a free list header, linking the node to an event scheduler or a temporary queue according to the number of arrived cells and departed cells, linking nodes which are linked to a present cell time slot location of the event scheduler to an output list, transferring the cell in the first node linked to output list header to the switch, and linking the node which was used by the just-departed cell to the free list, and if the number of arrived cells and departed cells including the just-departed cell are different, linking the first node of the temporary queue to an appropriate location of the event scheduler; and (c) if a cell has not arrived in step (a), linking nodes which are linked to the present cell time slot location of the event scheduler to the output list, transferring the cell in the first node linked to the output list header to the output list, and linking the node which was used by the just-departed cell to the free list.

BRIEF DESCRIPTION OF THE DRAWINGS

FIGS. 3A–3E schematically illustrate the operational principles of the present invention;

DETAILED DESCRIPTION OF THE PREFERRED EMBODIMENT

Figure 1:
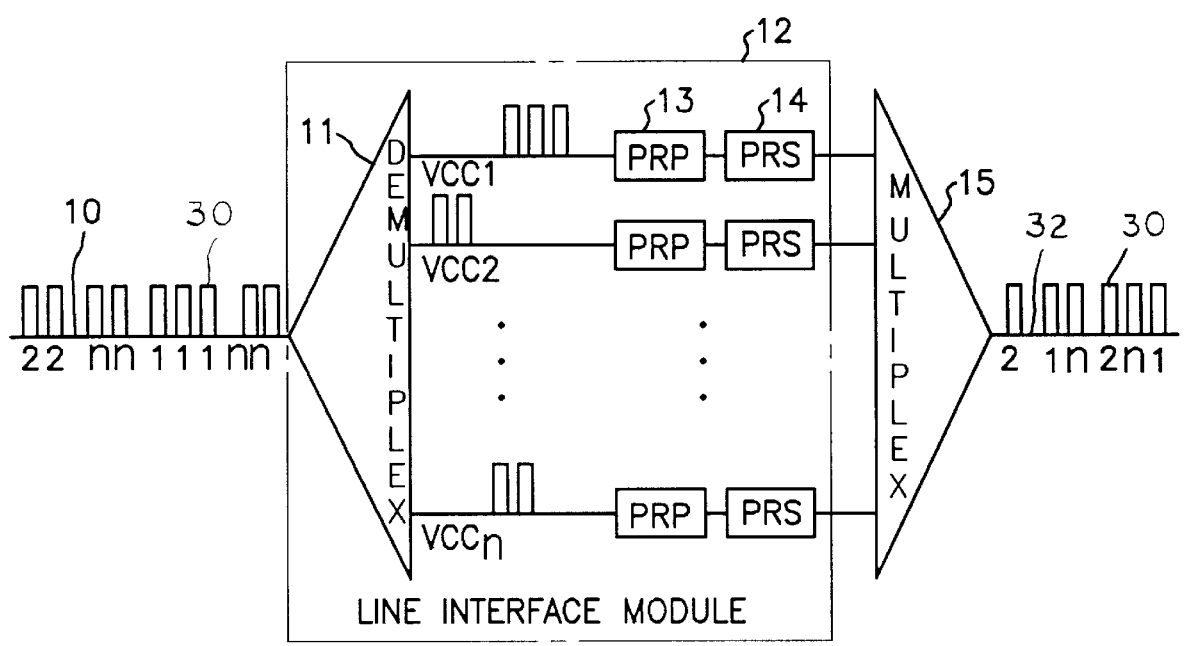
FIG. 1 is a block diagram of a system to which the present invention is applied.

FIG. 1 is a block diagram of a system to which the present invention applies.

An ATM network is connected to multiple subscriber lines and the transmission speed of each subscriber line is about 150 Mbps. One subscriber input line can be divided into multiple virtual paths and each virtual path can be divided into $2^{16}$ virtual channels. A virtual channel to be served is called a "virtual channel connection." Every cell passing through a subscriber input line can be identified by any combination of a virtual path identifier (VPI) and a virtual channel identifier (VCI) within the cell header. Cell streams with the same VPI/VCI identify one user connection.

As is shown in FIG. 1, each subscriber input line 10 is connected to a line interface module 12. The transmission speed of input line 10 is about 150 Mbps. The input line 10 carries n virtual channels, with virtual channels 1, 2, and n being depicted in FIG. 1. Reference number 30 represents a cell. FIG. 1 thus shows an example in which the input line 10 carries two consecutive cells 30 of virtual channel number 2, two consecutive cells 30 of virtual channel number n, three consecutive cells 30 of virtual channel number 1, and another two consecutive cells 30 of virtual channel number 2. The line interface module 12 includes a cell demultiplexing unit 11, a cell multiplexing unit 15, peak rate policing (PRP) units 13, and peak rate spacing (PRS) units 14. Although not shown, the cells 30 are stored in a cell buffer after being demultiplexed by unit 11. An output line 32 carries the demultiplexed cells from unit 15.

The PRP units 13 monitor the traffic incoming into the network based on the peak interval negotiated between the user and the network and the cell delay variation tolerance, and perform tagging or discarding of violating cells while sending well-conforming cells to the PRS units 14. Then, the PRS units 14 perform spacing for the cells at the negotiated peak interval, and send them to the ATM transfer network.

Figure 2:
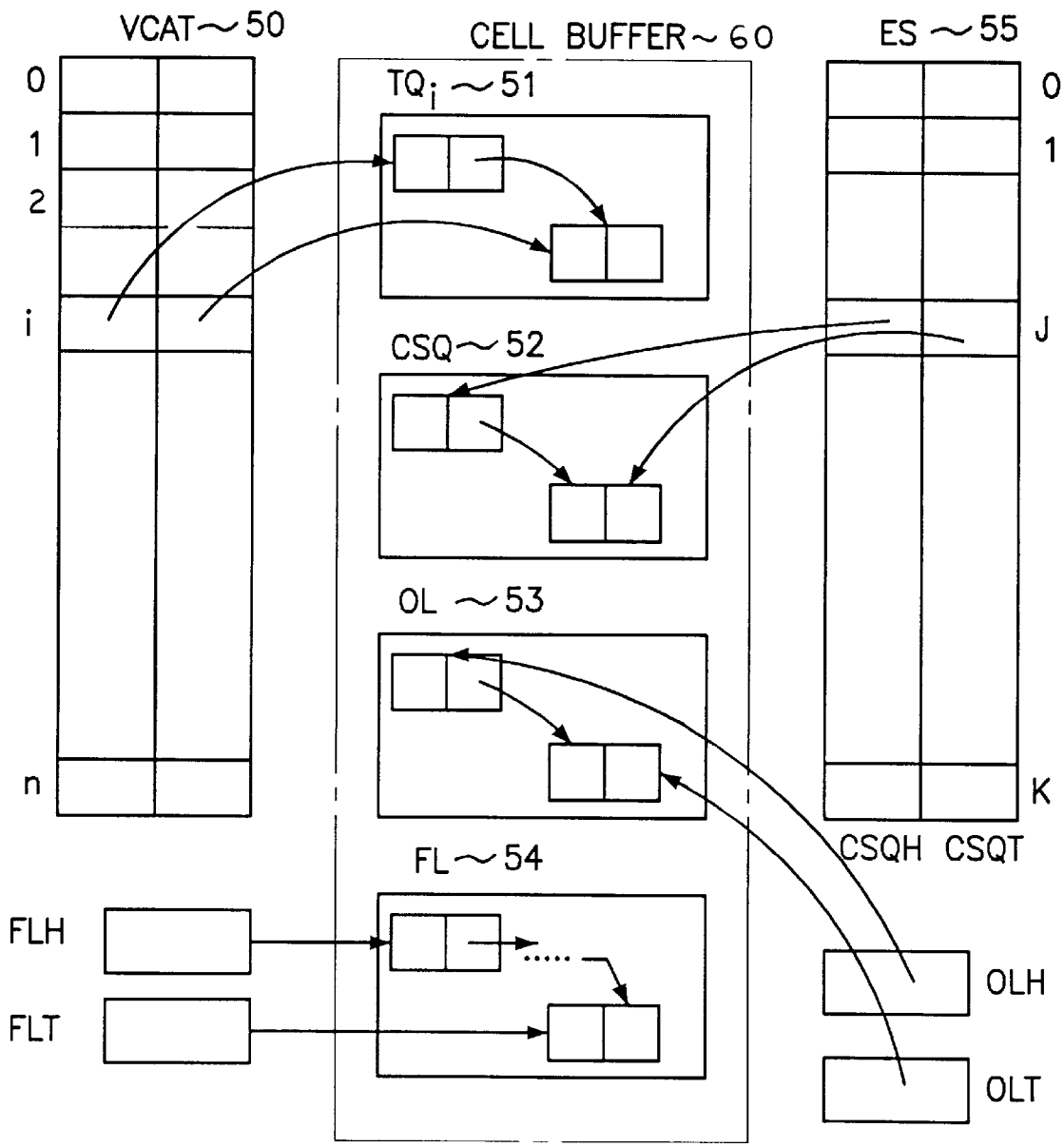
FIG. 2 is an example of data structures used in the present invention.

FIG. 2 is an example of data structures used in the present invention. A Virtual Channel connection Attribute Table (VCAT) 50 is a table which stores parameters for virtual channel connections necessary to space out the incoming cells 30 with intervals smaller than the peak interval negotiated between the user and the network.

The VCAT includes the following attributes for each virtual channel connection:

PI (Peak Interval): PI=[R/r], where R is the transmission speed of the input line 10 (e.g., 150 Mbps), r is the peak bit rate, and [X] means the largest integer that is less than or equal to X.

RDT (Recent Departure Time): Records the most recent time of departure of a cell 30 from a PRS unit 14.

NRC (Number of Residual Cells): Records the difference between cells that have arrived and cells that have departed. This variable increases by one when a cell arrives and is decremented by one when a cell departs.

TQH (Temporary Queue Head): Specifies the first cell of a temporary queue.

TQT (Temporary Queue Tail): Specifies the last cell of the temporary queue.

A cell buffer (CB) 60 comprises nodes (not numbered) that consist of a data field which may save one cell and a pointer field. The pointer specifies a different node within cell buffer 60 so that a linked list can be formed. Cell buffer 60 is used as a free list (FL) 54, cell slot queues (CSQ) 52, an output list (OL) 53, and temporary queues (TQ) 51.

An event scheduler (ES) 55 has two pointers, for each of K+1 time slots, which specify the first node and the last node of one of the cell slot queues 52. The ES 55 links the whole set of linked nodes to the end of the output list if the nodes are linked to the location designated by a value T (modulo K+1) indicating the present cell time slot. The valve T is incremented by one at the beginning of every cell cycle.

All nodes during system initialization are linked to the free list 54 through pointers. The cells are assigned to the first node linked to FL 54 when they arrive at a PRS 14. When a cell departs from the PRS 14, the node occupied by the cell is linked to the end of the free list FL.

The cell slot queues (CSQ) 52 store cells that are judged to comply with the negotiated peak interval.

The output list (OL) 53 saves the cells to be output to the present cell time slot T. If two or more cells are linked to output list 53, the remaining cells except the first cell depart consecutively at the cell time slots following the present cell time slot.

The temporary queues (TQ) 51 temporarily save the cells which have to wait until they get the judgment that they can comply with peak interval PI.

The term XH is used generically to represent a set of registers which save the address of various queues and lists. Here, X stands for FL, CSQ, OL, or TQ and H stands for header, so XH can represent FLH, CSQH, OLH, or TQH. Similarly, the term XT is used generically to represent registers which save the last or tail address of the queues and lists, with X standing for FL, CSQ, OL, or TQ and T standing for tail.

During the establishment of a connection for a virtual channel i, the peak interval (PI) of virtual channel connection attribute table 50 is set up. When a cell of virtual channel connection i arrives, the first node linked to the free list 54, that is, the node specified by the free list header, FLH, is brought up to save the cell. If the number of cells that have arrived is the same as the number of cells that have departed, the node will be linked to the "assumed location" (the assumed location is equal to the most recent departure time of a cell of a virtual channel connection plus the peak interval negotiated for the virtual channel connection) of the event scheduler (ES) 55. If not, the node will be linked to temporary queue (TQ) 51 for the i-th location of the virtual channel connection attribute table. The index T of the event scheduler 55 increases one by one for each time slot and is linked to the output list (OL) 53 if nodes are linked to the T location of the event scheduler 55. The output list 53 outputs the cells linked to the output list header OLH for each time slot. If the number of arrived cells is not the same as that of departed cells, including the just-outputted cell, the temporary queue 51 specified by the temporary queue header TQH of the virtual channel connection attribute table (VCAT) 50 is connected to the event scheduler 55.

FIGS. 3A–3E show an example which illustrates the operational principles of the present invention. The cell delay variation (CDV) is the variation of the periodic nature of the cell arrival process at the measurement point of the network. FIG. 3A illustrates time slots 0 through 19 of the event scheduler 55. In this example, two cells streams are multiplexed together and conveyed to the line interface module 12 (see FIG. 1). One of these cells streams, VCC1, has a peak interval PI=2 and the other cell stream, VCC2, has a peak interval PI=4. Each cell stream has clumping caused by CDVmax=3. The cells of VCC1 are represented by numbered squares in FIGS. 3B–3E and the cells of VCC2 are represented by numbered ovals.

FIG. 3B illustrates the arrival of cells at the peak rate spacing (PRS) units 14 for VCC1 and VCC2. In this example, cell #1 of VCC1 arrives at time slot 0, cell #2 of VCC1 arrives at time slot 1, cell #1 of VCC2 arrives at time slot 2, and so on. After cell #1 of VCC1 arrives at its PRS 14, it departs almost immediately and cell #2 of VCC1 is linked to the second cell slot queue position (CSQ[2]) to conform to the negotiated peak interval PI=2 for VCC1. This is shown in FIG. 3C, where the input of cell #1 of VCC1 and the linkage of cell #2 of VCC1 to the (CSQ[2]) position are shown above the horizontal line and the output of cell #1 of VCC1 is shown below the horizontal line. It will be recalled that cell #1 of VCC2 arrives at time slot 2 in this example, and FIG. 3B shows that the shifting of cell #2 of VCC1 thus causes output contention at the (CSQ[2]) position. This output contention is resolved by outputting cell #2 of VCC1 at time slot 2 and outputting cell #1 of VCC2 at time slot 3.

Skipping to time slot 7, cell #3 of VCC2 is linked to the temporary queue for VCC2, that is, to $TQ_2$, (see FIG. 3E), because cell #2 of VCC2 has not yet departed at the beginning of time slot 7. Cell #3 of VCC2, in $TQ_2$, is then linked to the (CSQ[11]) position as soon as cell #2 of VCC2 departs from its peak rate spacer unit 14.

FIG. 3B shows that cell #4 of VCC1 arrives at time slot 8. This is the first cell of a second cell-clumping period for VCC1, and FIG. 3C shows that it departs almost as soon as it arrives. Cell #5 of VCC1 arrives at time slot 9 and is thereupon linked to (CSQ[10]). However, cell #6 of VCC1 arrives at time slot 10, so it is linked to the temporary queue for VCC1 (that is, to $TQ_1$,) as shown in FIG. 3D. Cell #6 of VCC1 is then linked to the (CSQ[12]) position just after the departure of cell #5 of VCC1.

The treatment of the remaining cells in this example will be apparent from FIGS. 3A–3E in view of the above explanations. It will be seen that, with the present invention, cells depart from the peak rate spacing units conforming to the negotiated peak intervals almost perfectly, even if the cell arrival pattern is considerably irregular.

Referring once again to FIG. 2, it has already been mentioned that the temporary queues (TQ) 51 store cells temporarily to determine the exact departure time. Each virtual channel connection has its own temporary queue. A TQ 51 can be accessed by its TQH and TQT pointers. The cell slot queues (CSQ) 52 store cell lists per cell time slot. Cells in a CSQ 52 for a cell time slot are planned to depart at that cell time slot. The output list (OL) 53 stores cell lists which want to depart at the present cell time slot. If there exist more than two cells in the OL 53, the remaining cells, except the first cell, depart consecutively at the cell time slots following the present cell time slot. The free list (FL) 54 stores the empty space lists in the cell buffer (CB). The OL (53) can be accessed by the OL header pointer OLH and the OL tail pointer OLT. All cell buffers during system initialization are chained together to the free list 54 through the FL header and the FL tail pointers. Event scheduler (ES) 55 has header and tail information for each cell slot queue (CSQ) 52. T represents the present cell time slot (modulo K+1) and increases by one at the beginning of every cell time slot.

The present invention is based on a linked list mechanism, as in the prior work of Wallmeier et al described in the document entitled "The Spacing Policer, An Algorithm For Efficient Peak Bit Rate Control in ATM Networks," but it adopts a new method to secure the desired peak interval, even when two or more VCCs require the same cell time slot in the output line simultaneously (that is, when output contention exists). The present invention consists of three main processes: a cell arrival handling process, an output linking process, and a cell departure handling process. Programs for these processes are set forth below.

[Step 1] (Cell Arrival Handling Process)

```
/* Assume that a cell with VC identifier (VCI) = i arrives at
the cell time slot T*/
    if (this cell is the first cell of VCC_i) then
        VCAT[i].RDT= T, VCAT[i].NRC=1,
        link this cell to the end of the CSQ[T mod (K + 1)];
    else if (VCAT[i].NRC is equal to 0) then
        D=VCAT[i].RDT+VCAT[i].PI;
        if (D≧T) then
            link this cell to the end of the CSQ[D mod (K + 1)],
            VCAT[i].NRC = VCAT[i].NRC + 1;
    else if (D < T)
        D = T, VCAT[i].NRC + 1;
        link this cell to the end of the CSQ[D mod K + 1];
    else if (VCAT[i].NRC > 0) then
        link this cell to the end of the TQ_i,
        VCAT[i].NRC = VCAT[i].NRC + 1;
    end.
```

[Step 2] (Output Linking Process)

```
if (cells are linked at the CSQ[T mod (K + 1)] then
    link all linked cells to the end of the OL;
    end.
```

[Step 3] (Cell Departure Handling Process)

```
/* Assume that the first cell in the OL is a cell with VCI
i */
    VCAT[i].RDT = T, VCAT[i].NRC - VCAT[i].NRC =
    if (VCAT[i].NRC = 0) then
        transmit the first cell in the OL to the output
        line and link the cell buffer which contains this
        cell to the end of the FL.
    else if (VCAT[i].NRC > 0) then
        D = (T + VCAT[i].PI) mod (K + 1), link the first
        cell in the TQ_i to the end of the CSQ [D], transmit
        the first cell in the OL to the output line, and
        link the cell buffer which contains this cell to
        the end the FL.
    end.
```

The key idea of the present invention is that it prepares the temporary queues to determine the exact departure time when an output contention occurs, and the present invention also counts the numbers of the arriving and departing cells per connection. If there is no contention in the output line when a new cell with the VCI=i arrives, these two numbers are the same. In this case, the present invention calculates the expected departure time D as D=VCAT[i]. RDT+VCAT [i]. PI. If D≧T, the present invention links this cell to the end of the CSQ[D mod (K+1)], and if D<T, this cell is linked to the end of the CSQ[T mod (K+1)]. But if NRC>0 when a new cell arrives, the present invention temporarily links this cell to the $TQ_i$. Only when the previous cell with the VCI=i is transmitted to the output line does the present invention determine the exact next departure time for that VCC. So, as soon as the previous cell with the VCI=i departs the PRS unit, the first cell is brought from the $TQ_i$ and this cell is linked to the appropriate CSQ position, that is, D=(T+VCAT [i].PI) mod (K+1). K is determined by K=min($CDV_{max}$, max($PI_i$)+1), $1 \leq i \leq n$, where n is the number of VCCs accommodated together in the input line and $CDV_{max}$ denotes the maximum value of the CDV.

Figure 4:
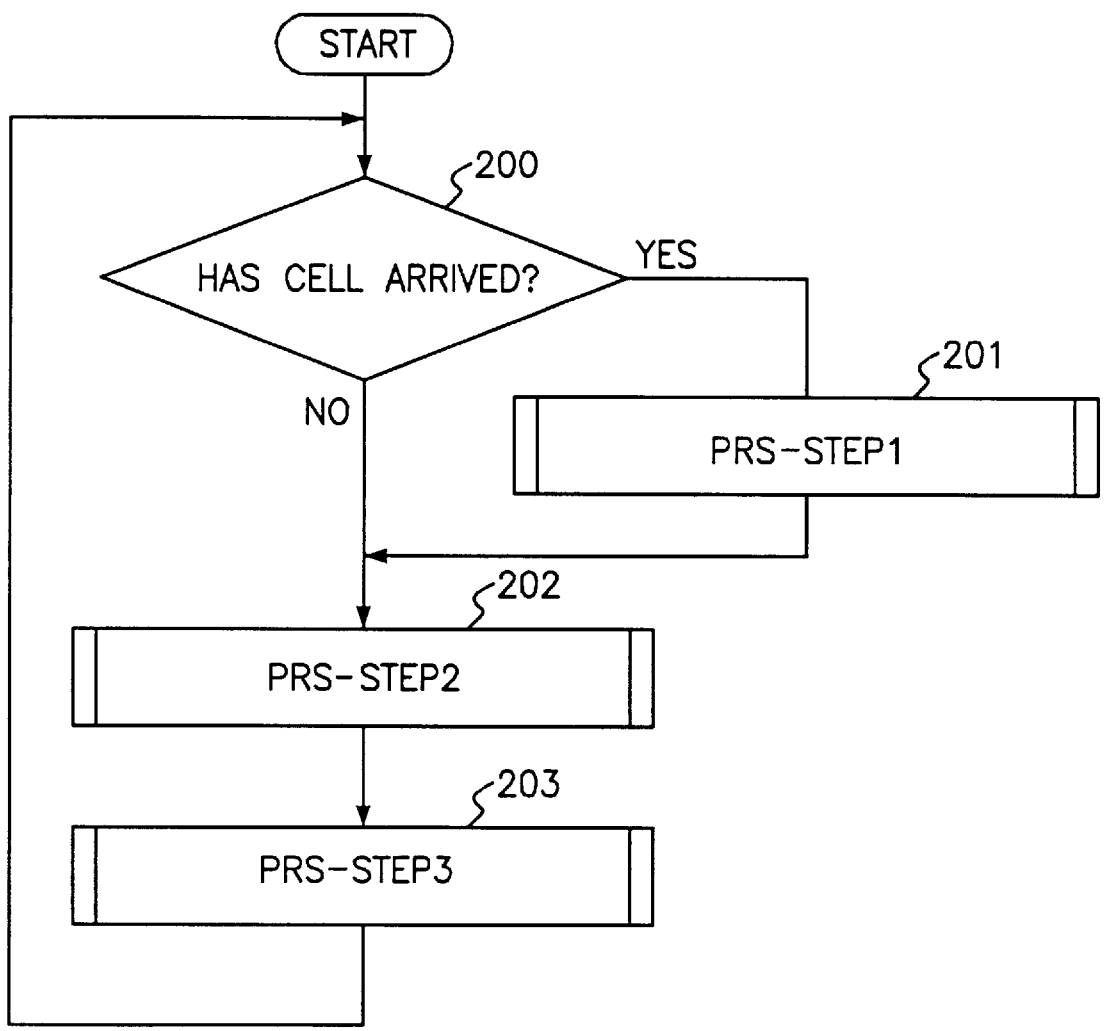
FIG. 4 is a flowchart illustrating a method for controlling the peak cell rate spacing in accordance with the present invention.

FIG. 4 is a flowchart illustrating the overall method for controlling the peak cell rate spacing in accordance with the present invention. It starts with a judgment about whether a cell has arrived in each time slot (step 200). Here, the time slot has a length or duration corresponding to the time spent when one cell (53 octets) is transferred at the maximum rate of the link.

If a cell has arrived, PRS-step1 (step 201), PRS-step2 (step 202), and then PRS-step3 (step 203) are performed in order. If a cell has not arrived, PRS-step2 (Step 202) and PRS-step3 (step 203) are performed in order. PRS-step1 is the cell arrival handling process that was discussed above, PRS-step2 is the output linking process, and PRS-step3 is the cell departure handling process.

Figure 5:
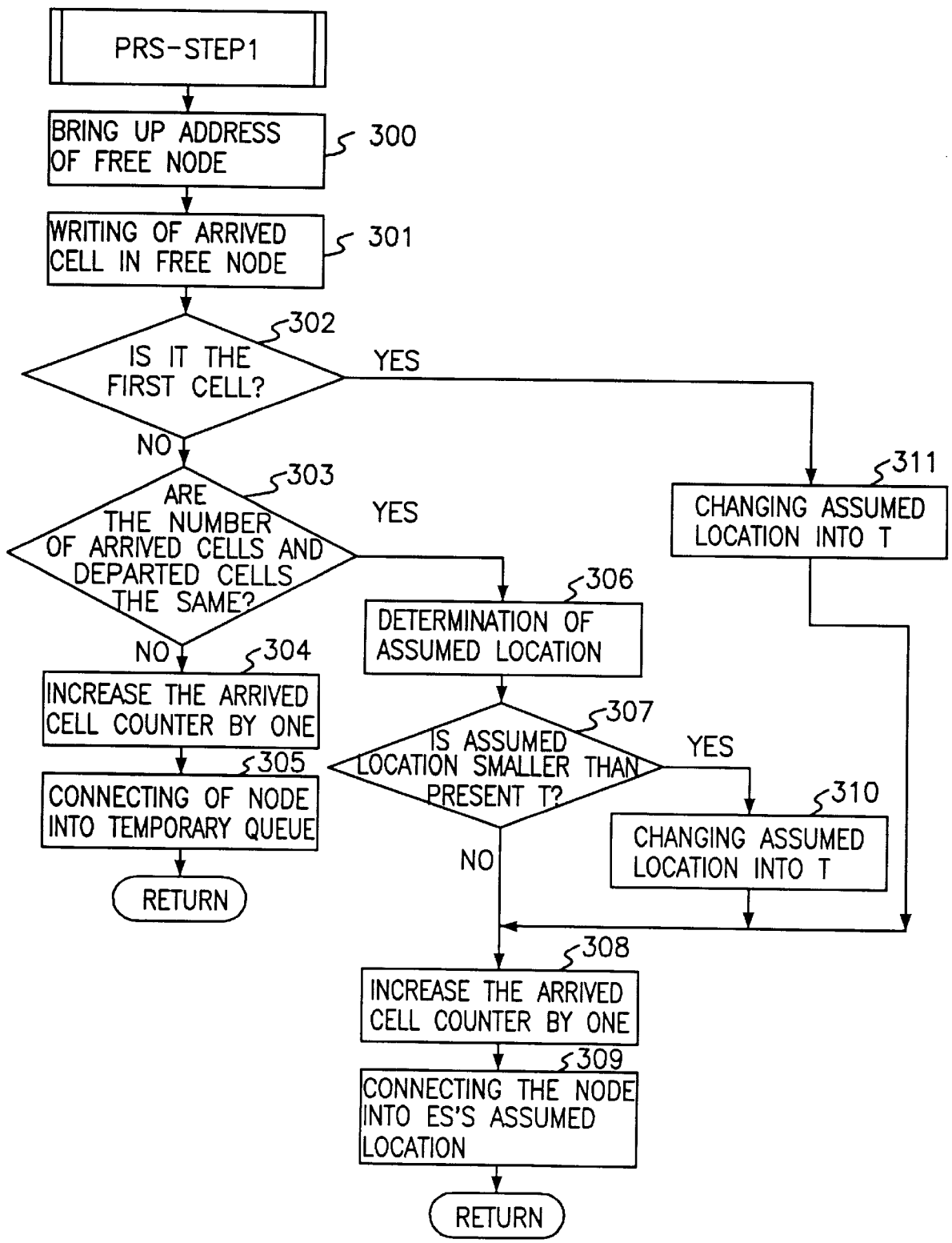
FIG. 5 is a detailed flowchart showing the cell arrival handling process of the present invention.

FIG. 5 is a detailed flowchart of PRS-step1 in FIG. 4.

The address of a free node where a presently arriving cell is to be saved is brought up and the cell is written in that location (steps 300, 301), and a judgment is made as to whether the cell is the first cell of an established connection (step 302). If the cell is the first one, the cell's assumed location is changed to T, indicating the present time slot (step 311). The arrived cell counter is then increased by one (step 308) and the node is linked to the event scheduler's assumed location (step 309). If the newly-arrived cell is not the first one of the connection ("no" at step 302), a judgment is made at step 303 as to whether the number of arrived cells is the same as that of the departed cells. If they are the same, the assumed location is determined (step 306). As was noted earlier, the assumed location is the value of the most recent departure time (RDT) plus the peak interval (PI) of that connection. That assumed location and the present time slot T are compared (step 307). If that assumed location is smaller than T, the assumed location is changed to T (step 310), the arrived cell counter is increased by one (step 308), and the node is linked to the event scheduler's assumed location (step 309). If the assumed location is not smaller than T, the node is linked to the event scheduler's assumed location (step 309) after the arrived cell counter is increased by one (step 308). If the number of the arrived cells is not the same as that of the departed cells, the node is linked to the temporary queue (step 305) after the arrived cell counter is increased by one (step 304).

Figure 6:
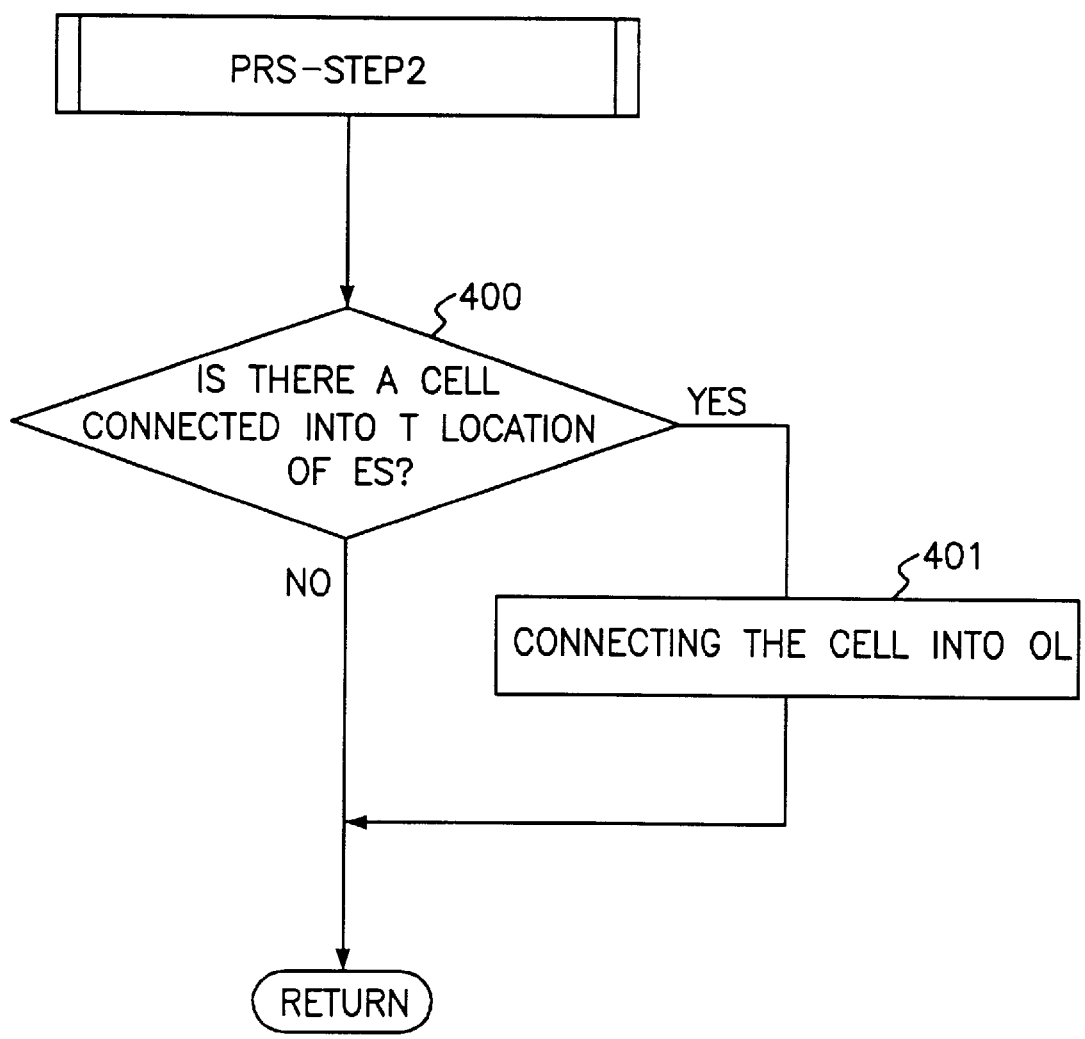
FIG. 6 is a detailed flowchart showing the cell output linking process of the present invention.

FIG. 6 is a detailed flowchart of PRS-step2 in FIG. 4.

It judges whether there is a cell linked to the event scheduler T location (step 400). If there is one, the cell (along with any other cells to which it has been linked) is linked to the end of the output list (step 401).

Figure 7:
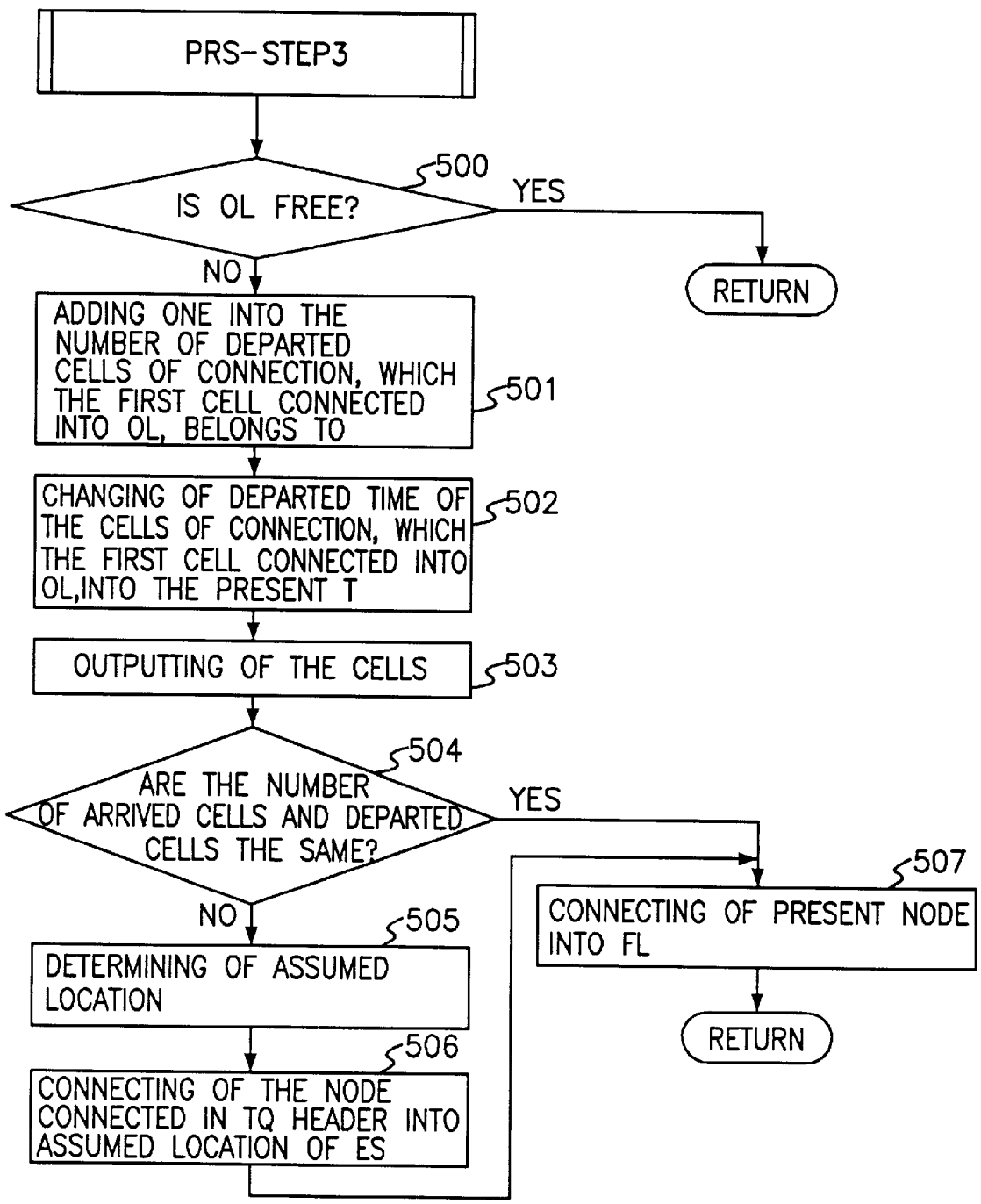
FIG. 7 is a detailed flowchart showing the cell departure handling process of the present invention.

FIG. 7 is a detailed flowchart of PRS-step3 in FIG. 4.

First, it judges whether there is a cell linked to the output list (step 500). If there is one, the counter indicating the number of the departed cells, which the first linked cell of the output list belongs to, is increased by one (step 501). A variable representing the most recent departure time is changed to the present time slot T (step 502). Then the cell is output (step 503). When the outputting of the cell is complete, the number of arrived cells and the number of departed cells of the connection are compared (step 504). If they are the same, the node which the output cell had is linked to the free list (step 507). If not, the assumed location is set up using the value of the present time slot T plus the peak interval of that connection (step 505). Then the node linked to the next temporary queue header is linked to the assumed location of the event scheduler (step 506).

The present invention, operating with the above procedures, is able to secure the negotiated peak interval even during output contention by using a temporary queue and counter for the number of the arrived cells and the number of departed cells of each connection. Accordingly, the bandwidth assignment is simplified and the bandwidth efficiency is improved.

It will be understood that the above description of the present invention is susceptible to various modifications, changes, and adaptations, and the same are intended to be comprehended within the meaning and range of equivalents of the appended claims.

What is claimed is:

1. A method of peak cell rate spacing for use with an asynchronous transfer mode (ATM) communication system, comprising:

(a) examining whether a cell has arrived for each of a plurality of time slots;

(b) if step (a) determines that a cell has not arrived, linking a cell which is linked to a present cell time slot location of an event scheduler, to an output list;

(c) if step (a) determines that a cell has arrived and if the cell is judged to be the first cell, changing an assumed location of that cell to the present time slot;

(d) if a cell is judged not to be the first cell, deciding whether the number of arrived cells is the same as the number of departed cells;

(e) if the number of arrived cells is not the same as the number of departed cells in step (d), increasing an arrived cell counter by one and linking the node to a temporary queue;

(f) if the number of arrived cells is the same as the number of departed cells in step (d), determining an assumed location, comparing the assumed location with the present time slot, and changing the assumed location to the present time slot if the assumed location is earlier than the present time slot;

(g) after either step (c) or (f) is performed, increasing the arrived cell counter by one and linking the node to the assumed location of the event scheduler;

(h) if there are nodes linked to the present time slot of the event scheduler after performing at least one of step (b), step (e) or step (g), linking all linked cells into the end of the output list;

(i) if there is a cell in the output list after performing step (h), increasing a counter indicating the number of departed cells, changing a variable representing the most recent cell departure time to the present time slot, outputting the cells, and comparing the number of arrived cells with the number of departed cells;

(j) if the number of arrived cells and the number of departed cells are the same in step (i), linking the node into a free list; and (k) if the number of arrived cells is not the same as the number of departed cells in step (i), determining an assumed location, linking the node, which is linked to a temporary queue header, to the assumed location of the event scheduler, and linking the node into the free list.

* * * * *